United States Patent
Yoon

(10) Patent No.: US 8,228,844 B2
(45) Date of Patent: Jul. 24, 2012

(54) CONTROL STATION AND METHOD FOR SETTING IDLE TIME FOR BASE STATION

(75) Inventor: Tai-Ho Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 247 days.

(21) Appl. No.: 12/321,810

(22) Filed: Jan. 26, 2009

(65) Prior Publication Data
US 2009/0196305 A1     Aug. 6, 2009

(30) Foreign Application Priority Data
Jan. 31, 2008     (KR) .................. 10-2008-0010295

(51) Int. Cl.
*H04W 4/00*     (2009.01)

(52) U.S. Cl. .................. 370/328; 370/252; 370/370

(58) Field of Classification Search .......... 370/200–253, 370/450–461, 320–342, 311, 395.41, 370/388; 455/231, 11.1, 464, 450, 560–561, 77–78
See application file for complete search history.

(56) References Cited

U.S. PATENT DOCUMENTS

| | | | | |
|---|---|---|---|---|
| 6,504,833 | B1 * | 1/2003 | Ishii et al. | 370/342 |
| 7,643,790 | B2 * | 1/2010 | Jang et al. | 455/11.1 |
| 7,676,749 | B2 * | 3/2010 | Tobe | 715/741 |
| 2003/0143959 | A1 * | 7/2003 | Harris et al. | 455/77 |
| 2005/0096089 | A1 * | 5/2005 | Ishii et al. | 455/561 |
| 2006/0153139 | A1 * | 7/2006 | Bae et al. | 370/335 |
| 2007/0064638 | A1 * | 3/2007 | Banniza et al. | 370/315 |
| 2007/0280263 | A1 * | 12/2007 | Chen et al. | 370/395.31 |

* cited by examiner

*Primary Examiner* — Pao Sinkantarakorn
*Assistant Examiner* — Iqbal Zaidi

(57) ABSTRACT

A control station communicates with at least one base station in a wireless network system. The control station includes a storage and a controller. The storage stores reference data for calculating the idle time according to the number of terminals. When an arbitrary one of the base stations undergoes a change in the number of terminals, the controller sets an idle time calculated by the reference data stored in the storage as the idle time of the base station using the changed number of terminals. As a result, the control station resets the idle time of each base station according to the number of terminals communicating with the base station, so that the base station can be relieved of a load of wireless resources, and smoothly accommodate terminals more than before.

20 Claims, 5 Drawing Sheets

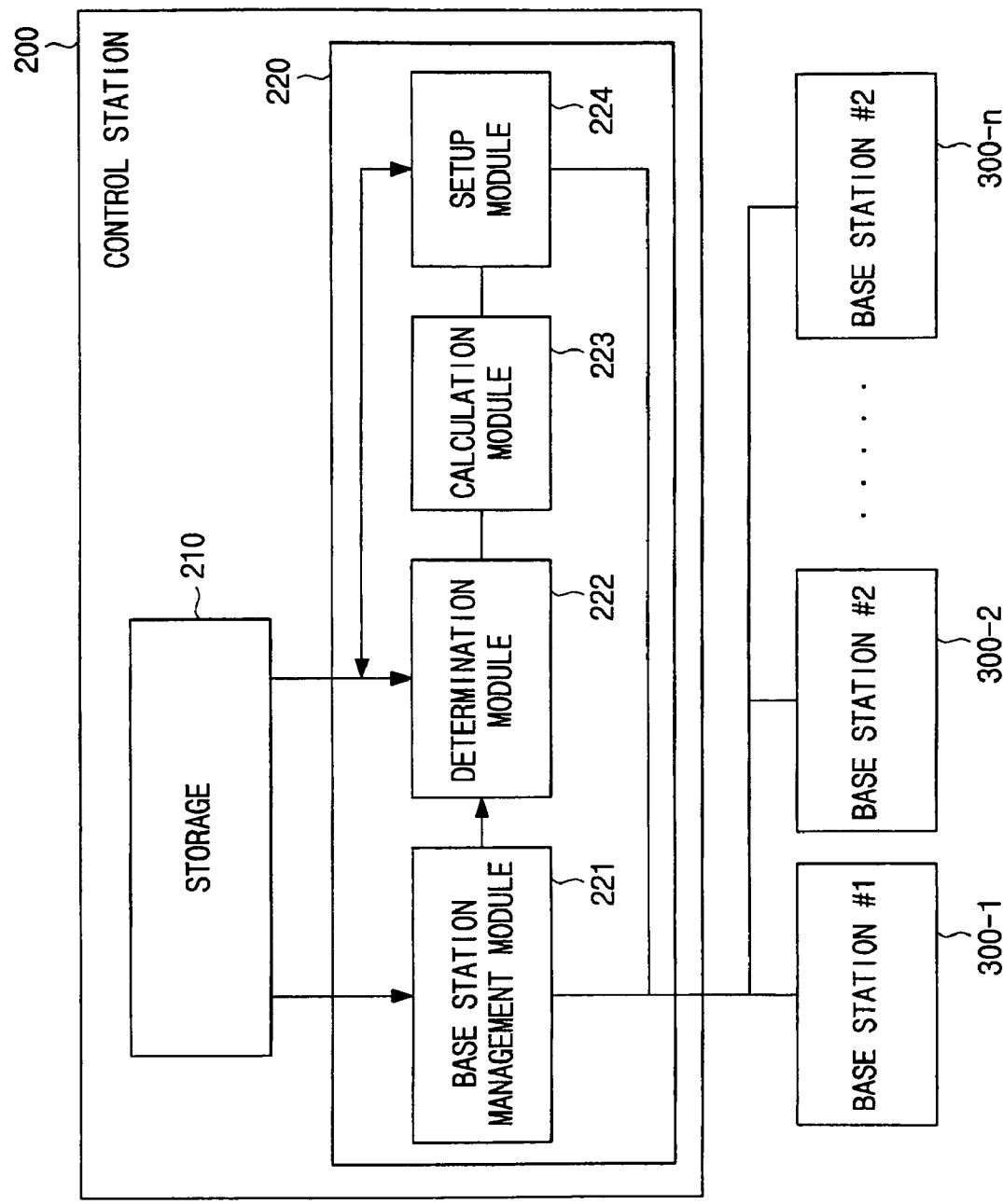

FIG.3A

| BASE STATION | Job Count | Idle Time |
|---|---|---|
| BASE STATION #1 | 70 | 70 sec |
| BASE STATION #2 | 102 | 60 sec |
| ⋮ | ... | ... |
| BASE STATION #n | 153 | 40 sec |

FIG.3B

| REFERENCE RANGE | Idle Time |
|---|---|
| 100 OR LESS | 70 sec |
| 101 ~ 120 | 60 sec |
| 121 ~ 150 | 50 sec |
| 151 ~ 180 | 40 sec |
| 181 OR MORE | 30 sec |

CONTROL STATION AND METHOD FOR SETTING IDLE TIME FOR BASE STATION

CROSS-REFERENCE TO RELATED APPLICATION(S) AND CLAIM OF PRIORITY

The present application makes reference to and claims all benefits accruing under 35 U.S.C. §119 from an application for "CONTROL STATION AND METHOD FOR SETTING IDLE TIME FOR BASE STATION" earlier filed in the Korean Intellectual Property Office on Jan. 31, 2008 and there duly assigned Serial No. 10-2008-0010295.

TECHNICAL FIELD OF THE INVENTION

The present invention relates to a control station and method for setting an idle time for a base station, which changes a reference time (hereinafter, referred to as "idle time") used by an idle timer of the base station providing an idle mode to a terminal or a mobile station in a wireless network system.

BACKGROUND OF THE INVENTION

Conventionally, wireless network services are characterized by an idle timer of each base station that selects a terminal, which is free from data traffic for a predetermined idle time, using the idle time and transitions the selected terminal into an idle mode.

In this case, since the idle time is always used as a fixed time, a load of data increases when the number of terminals communicating with the base station increases which leads to delay of data traffic, so that a communication operation, such as hand-off, is delayed.

To the contrary, when the number of terminals communicating with the base station reduces, the terminal is transitioned on the basis of the pervious fixed time. As such, some of the terminals are unnecessarily transitioned to the idle mode although the base station is not short of wireless resources.

Thus, there is rising a demand for a method of effectively improving the idle mode in which the base station operates.

SUMMARY OF THE INVENTION

To address the above-discussed deficiencies of the prior art, it is a primary object to provide a control station and method for setting an idle time for a base station, which changes and sets the idle time of each base station depending on the number of terminals registered with each base station.

The present invention also provides a control station and method for setting an idle time for a base station, which provides reference data for calculating the idle time corresponding to the number of terminals.

According to an aspect of the invention, there is provided a control station setting an idle time of at least one base station in a wireless network system. The control station includes: a storage storing reference data for calculating the idle time according to a number of terminals; and a controller setting the idle time calculated based on the reference data stored in the storage as the idle time of the base station using the number of terminals which is changed at an arbitrary base station.

In an embodiment of the present invention, the controller may include: a determination module determining whether or not there is a base station undergoing a change in the number of terminals; a calculation module calculating the idle time corresponding to the changed number of terminals based on the reference data stored in the storage when the base station undergoing a change in the number of terminals exists as a result of the determination by the determination module; and a setup module setting the calculated idle time as the idle time of the base station undergoing a change in the number of terminals.

In another embodiment of the present invention, the calculation module may calculate the idle time of the base station based on the change in the number of terminals.

In another embodiment of the present invention, the reference data may include at least one reference range of the number of terminals and the idle time corresponding to each reference range.

In another embodiment of the present invention, the calculation module may calculate the idle time corresponding to one selected from the reference ranges of the reference data, wherein the selected reference range corresponds to the changed number of terminals.

According to another aspect of the invention, there is provided a method of setting an idle time for a base station using a control station. The method includes: determining whether or not there is a base station undergoing a change in number of terminals; and calculating the idle time corresponding to the changed number of terminals when the base station undergoing a change in the number of terminals exists as a result of the determination by the determination module, and setting the calculated idle time as the idle time of the base station.

In an embodiment of the present invention, setting the calculated idle time may include calculating the idle time of the base station based on the changed number of terminals.

In another embodiment of the present invention, setting the calculated idle time may include: calculating the idle time corresponding to the changed number of terminals using prestored reference data; and setting the calculated idle time as the idle time of the base station.

In another embodiment of the present invention, the reference data may include at least one reference range of the number of terminals and the idle time corresponding to each reference range.

In another embodiment of the present invention, calculating the idle time may include calculating the idle time corresponding to one selected from the reference ranges of the reference data, wherein the selected reference range corresponds to the changed number of terminals.

According to embodiments of the present invention, the control station resets the idle time of each base station according to the number of terminals communicating with the base station, so that the base station having a large number of terminals is switched into the idle mode earlier than before, while the base station having a small number of terminals is switched into the idle mode later than before.

In detail, when the number of terminals communicating with the base station increases, an idle time shorter than before is set for the base station, and thus the corresponding base station can smoothly accommodate the terminals more than before.

In contrast, when the number of terminals communicating with the base station decreases, an idle time longer than before is set for the base station, and thus the terminal avoids unnecessary switching into the idle mode. Further, the available resources of the base station can be effectively used.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2 is a block diagram illustrating a configuration of a control station illustrated in FIG. 1;

FIG. 3A illustrates the number of terminals and the idle time stored by a control station in a wireless network system according to an embodiment of the present invention;

FIG. 3B illustrates reference data stored by a control station in a wireless network system according to an embodiment of the present invention;

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network system.

Figure 1:
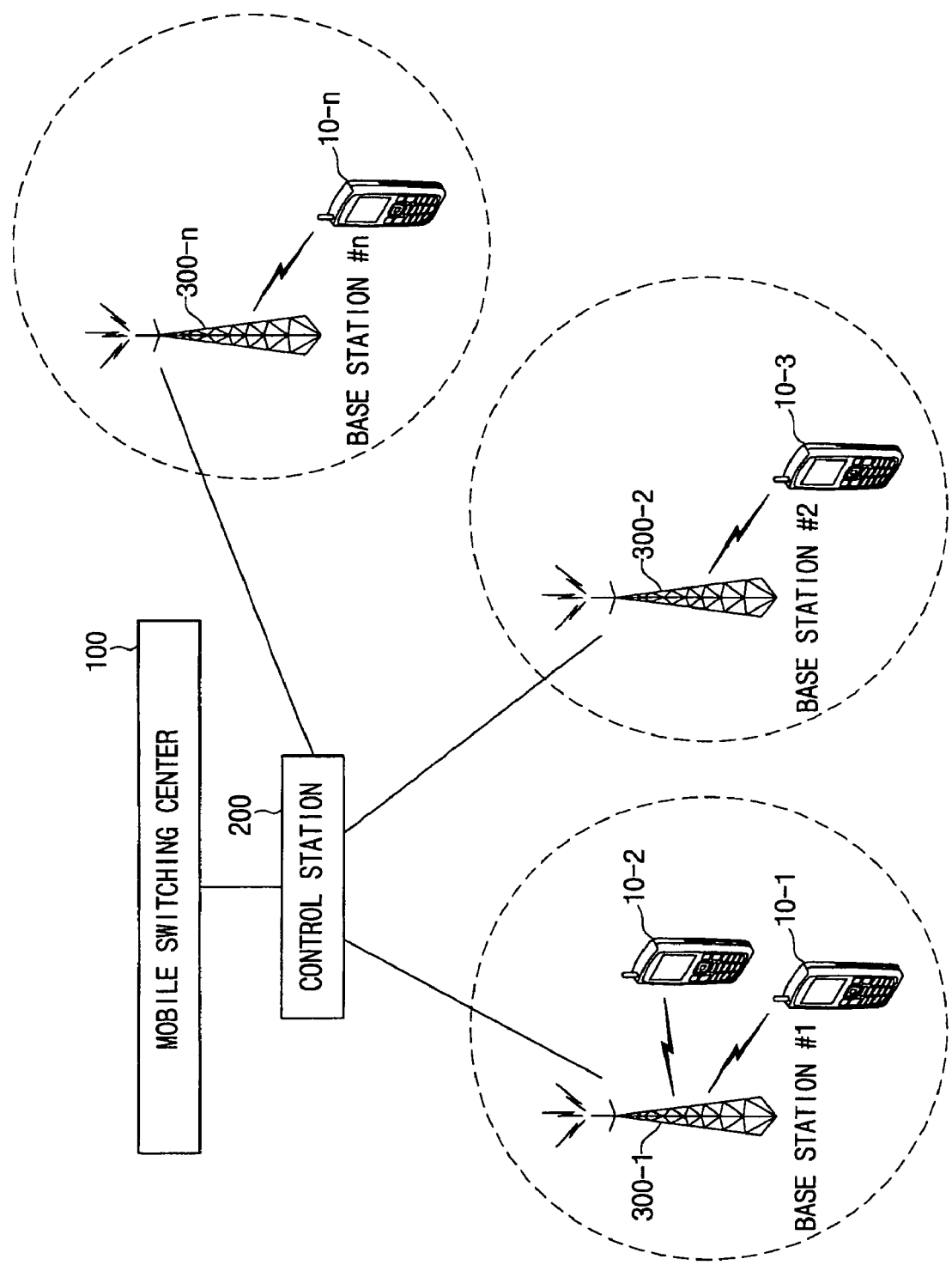
FIG. 1 is a block diagram illustrating the configuration of a wireless network system according to an embodiment of the present invention.

FIG. 1 is a block diagram illustrating the configuration of a wireless network system according to an embodiment of the present invention, and FIG. 2 is a block diagram illustrating a configuration of a control station illustrated in FIG. 1.

Referring to FIG. 1, the wireless network system generally includes a mobile switching center 100, a control station 200, and a plurality of base stations 300-1 to 300-n.

According to an embodiment of the prevent invention, the wireless network system will be described on the basis of Wireless Broadband (WiBro) (which is the Korean service name for the IEEE 802.16e (Mobile Worldwide Interoperability for Microwave Access (M-WiMAX)) international standard). However, the wireless network system is not limited to WiBro, but it may include other wireless network systems such as High Speed Packet Access (HSPA), Long Term Evolution (LTE), and Ultra Mobile Broadband (UMB).

First, the mobile switching center 100 configures a traffic path of a subscriber, and provides access to another network system.

The control station 200 controls a wired link and a wireless link to perform a hand-off function for maintaining the continuity of speech while the subscriber is moving. Further, the control station 200 resets an idle time of each of the base stations 300-1 to 300-n in communication therewith.

Each of the base stations 300-1 to 300-n registers at least one terminal 10-1 to 10-3 located within its cell coverage through a wireless protocol, thereby enabling communication of the terminal. Further, each of the base stations 300-1 to 300-n provides an idle mode to the terminal on the basis of the idle time set by the control station 200.

At this time, each of the base stations 300-1 to 300-n selects any terminal without data traffic for the corresponding idle time according a known method of providing the idle mode (wherein the data traffic-free terminal refers to a terminal to which the base station has not requested to assign a downlink (DL) or uplink (UL) slot in the case of the M-WiMAX international standard), and then transitions the selected terminal to the idle mode.

As illustrated in FIG. 2, the control station 200 includes a storage 210 storing reference data for calculating the idle time according to the number of terminals, and a controller 220 calculating and resetting the idle time according to the number of terminals connected to each of the base stations 300-1 to 300-n.

First, the storage 210 stores the number of terminals and the idle time corresponding to each of the base stations 300-1 to 300-n (see FIG. 3A), and the reference data for calculating the idle time according to an arbitrary number of terminals (see FIG. 3B).

Referring to FIG. 3A, there is shown the base stations 300-1 to 300-n, the number of terminals (indicated by "Job Count") corresponding to each of the base stations 300-1 to 300-n, and the idle time corresponding to each of the base stations 300-1 to 300-n. Referring to FIG. 3B, there is shown the reference data that includes at least one reference range of the number of terminals and the idle time corresponding to each reference range. However, the embodiment is not limited to these data values.

Particularly, the reference data shown in FIG. 3B is implemented as a data table. In the data table, when the number of terminals corresponds to the reference range of 100 or less, the idle time is calculated at 70 sec. In the case of the reference range between 101 and 120, the idle time is calculated at 60 sec. In the case of the reference range between 121 and 150, the idle time is calculated at 50 sec. In the case of the reference range between 151 and 180, the idle time is calculated at 40 sec. In the case of the reference range of 181 or more, the idle time is calculated at 30 sec. The embodiment is not limited to this configuration.

Consequently, the reference data is configured in such a manner that the higher the number of terminal becomes, the shorter the idle time becomes. Thus, the terminals connected to each of the base stations 300-1 to 300-n enter the idle mode earlier than before, so that the number of terminals connected to the corresponding base station can be further increased.

In contrast, the reference data is configured in such a manner that the lower the number of terminal becomes, the longer the idle time becomes. Thus, the terminals connected to each of the base stations 300-1 to 300-n enter the idle mode later than before, so that the available resources of each of the base stations 300-1 to 300-n can be effectively used.

Figure 3C:
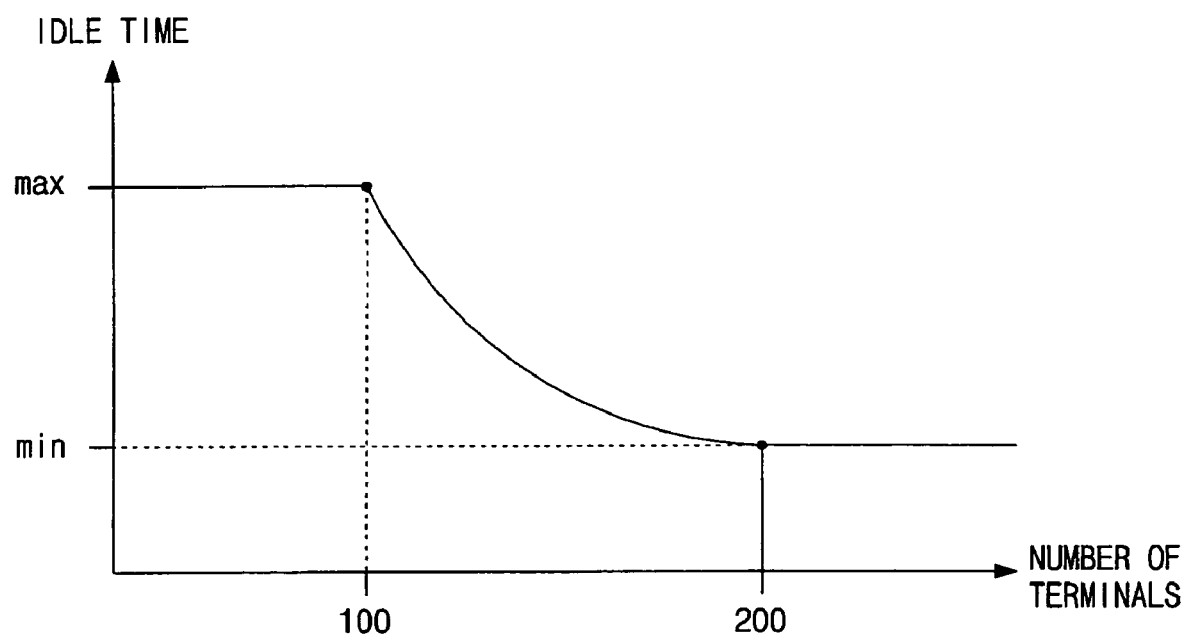
FIG. 3C is a graph illustrating reference data stored by a control station in a wireless network system according to an embodiment of the present invention.

The reference data showing this result can be expressed into a graph, which is illustrated in FIG. 3C.

It can be seen from the graph of FIG. 3C that the higher the number of terminal becomes, the shorter the idle time becomes, or that the lower the number of terminal becomes, the longer the idle time becomes.

Here, when the idle time is increased to a certain point, the idle mode of the terminal becomes insignificant. Thus, the maximum idle time is set for a specified reference range (e.g. 100). Further, since it takes the terminal a certain amount of time to be transitioned to the idle mode, the minimum idle time is set for another specified reference range (e.g. 200). The embodiment is not limited to this configuration.

The controller 220 calculates the idle time according to the number of terminals connected to each base station using the reference data stored in the storage 210, thereby changing the idle time of the corresponding base station.

To this end, the controller 220 includes a base station management module 221 managing registration and deregistration of the terminal with respect to the corresponding base station, a determination module 222 determining whether or not there is a base station undergoing a change in the number of terminals, a calculation module 223 calculating the idle time, and a setup module 224 setting the calculated idle time to the idle time of the corresponding base station.

The base station management module 221 receives a registration or deregistration message from an arbitrary terminal according to a method of performing hand-off on the terminal and a method of deregistering the terminal, and registers or deregisters the arbitrary terminal with respect to the corresponding base station in response to the registration or deregistration message. Then, the base station management module 221 counts the number of terminals communicating with any base station, and stores the counted number in the storage 210.

On the basis of a result of the counting by the base station management module 221 (for example, the number of terminals of the base station #1 is counted up to 102), the determination module 222 determines whether or not there is a base station undergoing a change in the number of terminals.

When it is determined by the determination module 222 that a base station undergoing a change in the number of terminals exists, namely that the base station #1 exists, the calculation module 223 calculates the idle time corresponding to the changed number of terminals on the basis of the reference data stored in the storage 210.

For example, if the changed number of terminals is 102, this number falls within the reference range of the reference data between 101 and 120. Thus, the calculation module 223 calculates the idle time to be 60 sec.

According to an embodiment of the present invention, the calculation module 223 calculates the idle time corresponding to the changed number of terminals on the basis of the pre-stored reference data. However, the embodiment is not limited to this configuration. For example, the calculation module may calculate the idle time using a numerical formula for calculating the idle time corresponding to the changed number of terminals.

The setup module 224 sets the idle time (60 sec) calculated by the calculation module 223 to the idle time of the corresponding base station (e.g. the base station #1).

Figure 4:
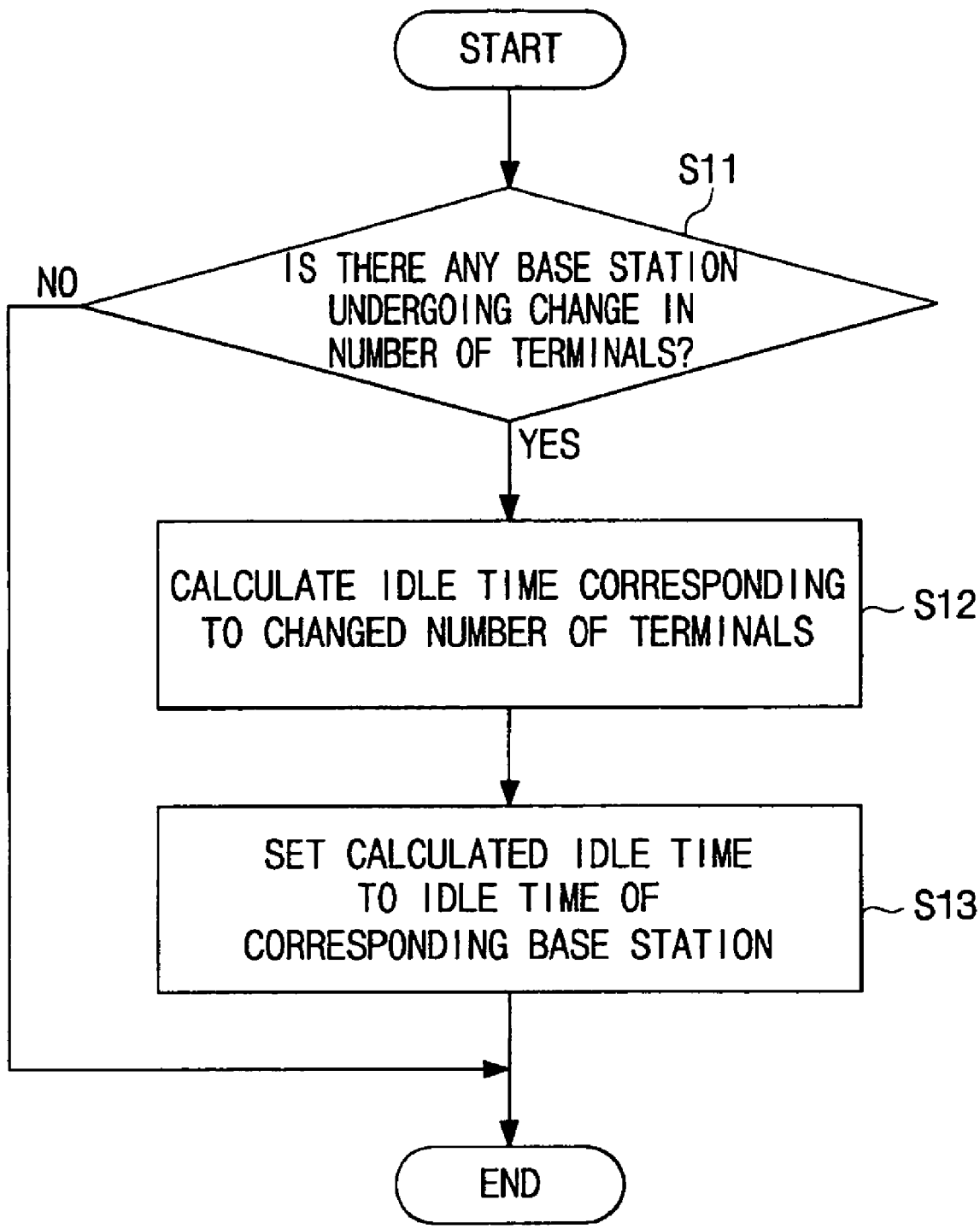
FIG. 4 is a flow chart illustrating the operation of a control station in a wireless network system according to an embodiment of the present invention.

FIG. 4 is a flow chart illustrating the operation of a control station in a wireless network system according to an embodiment of the present invention.

First, the determination module 222 determines whether or not there is a base station undergoing a change in the number of terminals on the basis of the number of terminals of each base station which is stored in the storage 210 (S11).

At this time, the stored number of terminals of each base station is counted and set according to a method of performing hand-off on the terminal and a method of deregistering the terminal by the base station management module 221.

Next, the calculation module 223 calculates the idle time corresponding to the changed number of terminals on the basis of the reference data stored in the storage 210 when it is determined in step S11 that a base station undergoing a change in the number of terminals exists (S12).

Then, the setup module 224 sets the idle time calculated by the calculation module 223 in the storage 210 as the idle time of the corresponding base station (S13).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A control station configured to set an idle time of at least one base station in a wireless network system, the control station comprising:
   a storage configured to store reference data used to calculate the idle time according to a number of terminals in communication with the at least one base station; and
   a controller configured to set the idle time calculated based on the reference data stored in the storage as the idle time of the at least one base station, the controller comprising:
   a determination module configured to determine whether or not the at least one base station is undergoing a change in the number of terminals in communication with the at least one base station;
   a calculation module configured to calculate an adjusted idle time corresponding to the changed number of terminals based on the reference data stored in the storage when the at least one base station undergoes a change in the number of terminals in communication with the at least one base station as determined by the determination module; and
   a setup module configured to set the calculated idle time as the idle time of the at least one base station.

2. The control station according to claim 1, wherein the controller further includes:
   a base station management module configured to count a number of terminals communicating with a base station, and store the counted number in the storage.

3. The control station according to claim 1, wherein the calculation module calculates the idle time of the at least one base station based on the change in the number of terminals.

4. The control station according to claim 1, wherein the reference data includes at least one reference range of the number of terminals and an idle time corresponding to each reference range.

5. The control station according to claim 4, wherein the calculation module calculates the idle time corresponding to one selected from the reference ranges of the reference data, the selected reference range corresponding to the changed number of terminals.

6. The control station according to claim 1, wherein the reference data includes at least one reference range of the number of terminals and an idle time corresponding to each reference range.

7. A method of setting an idle time for a base station using a control station, the method comprising:

determining, at a determination module, that a base station is undergoing a change in the number of terminals in communication with the base station;

calculating, at a calculation module, an adjusted idle time corresponding to the changed number of terminals based on reference data stored in a storage when the base station undergoes a change in the number of terminals in communication with the base station as determined by the determination module; and setting, at a setup module, the calculated idle time as the idle time of the base station.

8. The method according to claim 7, wherein setting the calculated idle time includes calculating the idle time of the base station based on the changed number of terminals.

9. The method according to claim 7, wherein setting the calculated idle time includes:

calculating the idle time corresponding to the changed number of terminals using pre-stored reference data; and setting the calculated idle time as the idle time of the base station.

10. The method according to claim 9, wherein the reference data includes at least one reference range of the number of terminals and an idle time corresponding to each reference range.

11. The control station according to claim 10, wherein the calculating of the idle time includes calculating the idle time corresponding to one selected from the reference ranges of the reference data, the selected reference range corresponding to the changed number of terminals.

12. A control station configured to set an idle time of at least one base station in a wireless network system, the control station comprising:

a determination module configured to determine whether or not a base station is undergoing a change in the number of terminals in communication with the base station;

a calculation module configured to calculate an adjusted idle time corresponding to the changed number of terminals based on reference data stored in a storage when the base station undergoes a change in the number of terminals in communication with the base station as determined by the determination module; and a setup module configured to set the calculated idle time as the idle time of the base station undergoing the change in the number of terminals.

13. The control station according to claim 12, wherein the calculation module calculates the idle time of the base station based on the change in the number of terminals.

14. The control station according to claim 12, wherein the reference data includes at least one reference range of the number of terminals and an idle time corresponding to each reference range.

15. The control station according to claim 14, wherein the calculation module calculates the idle time corresponding to one selected from the reference ranges of the reference data, the selected reference range corresponding to the changed number of terminals.

16. A method of setting an idle time for a base station using a control station, the method comprising:

detecting, at a detection module, when a base station undergoes a change in the number of terminals in communication with the base station;

calculating, at a calculation module, an adjusted idle time corresponding to the changed number of terminals based on reference data stored in a storage when the base station undergoes a change in the number of terminals in communication with the base station as determined by the determination module; and setting, at a setup module, the calculated idle time as the idle time of the base station.

17. The method according to claim 16, wherein setting the calculated idle time includes calculating the idle time of the base station based on the changed number of terminals.

18. The method according to claim 16, wherein setting the calculated idle time includes:

calculating the idle time corresponding to the changed number of terminals using pre-stored reference data; and setting the calculated idle time as the idle time of the base station.

19. The method according to claim 18, wherein the reference data includes at least one reference range of the number of terminals and an idle time corresponding to each reference range.

20. The control station according to claim 19, wherein the calculating of the idle time includes calculating the idle time corresponding to one selected from the reference ranges of the reference data, the selected reference range corresponding to the changed number of terminals.

* * * * *